Figure 1:
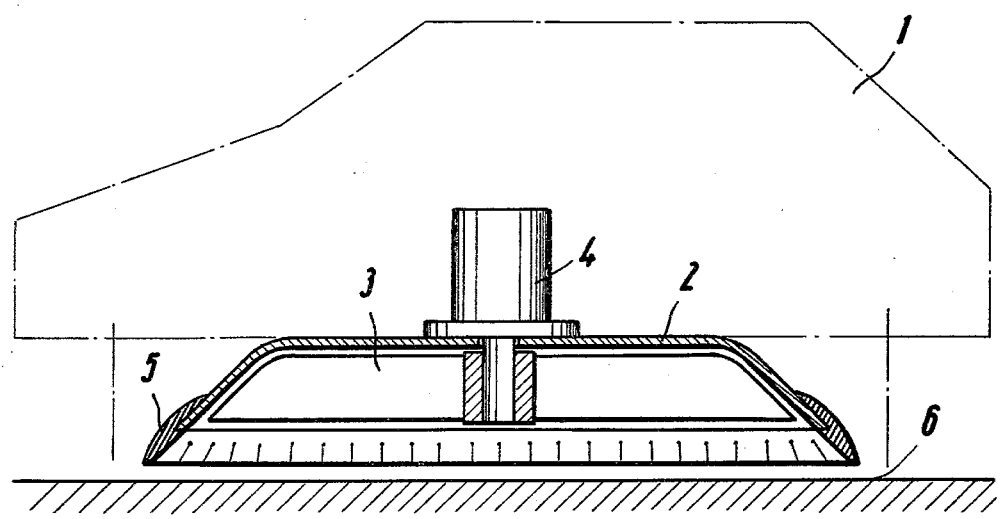

United States Patent [19]

Graf

[11] 4,193,469
[45] Mar. 18, 1980

[54] VEHICLE ATTACHMENT FOR INCREASING ADHESION TO THE SUPPORTING SURFACE BY SUCTION FORCE

[76] Inventor: Dieter Graf, Lupsteiner Weg 4, 1 Berlin 37, Fed. Rep. of Germany

[21] Appl. No.: 864,547

[22] Filed: Dec. 27, 1977

[30] Foreign Application Priority Data

Jan. 5, 1977 [DE] Fed. Rep. of Germany ....... 2700395

[51] Int. Cl.² ............................................. B60B 39/00
[52] U.S. Cl. ................................................. 180/164
[58] Field of Search ............. 180/115, 116, 125, 1 FS, 180/1 P, 7 P

[56] References Cited

U.S. PATENT DOCUMENTS

| | | | |
|---|---|---|---|
| 1,698,482 | 1/1929 | Nicin | 180/115 |
| 3,116,897 | 1/1964 | Theed | 180/115 X |
| 3,209,849 | 10/1965 | Gondert | 180/115 |
| 3,215,218 | 11/1965 | Hurst | 180/115 |
| 3,628,625 | 12/1971 | Boyles | 180/115 |
| 3,659,678 | 5/1972 | Hall | 180/115 |
| 3,892,287 | 7/1975 | Bennett | 180/115 |
| 3,926,277 | 12/1975 | Shino | 180/115 |

*Primary Examiner*—Joseph F. Peters, Jr.
*Assistant Examiner*—Randall A. Schrecengost
*Attorney, Agent, or Firm*—Parmelee, Johnson, Bollinger & Bramblett

[57] ABSTRACT

A device for generating a suction force between a vehicle and a surface having a hood connected to the vehicle. The hood is positioned between the vehicle and the surface, and has an opening defined in a direction towards the surface. A bladed wheel is accommodated within the opening of the hood, and means are provided to drive the bladed wheel.

7 Claims, 2 Drawing Figures

VEHICLE ATTACHMENT FOR INCREASING ADHESION TO THE SUPPORTING SURFACE BY SUCTION FORCE

DESCRIPTION

The invention relates to a device for the generation of a suction force between a vehicle and a surface.

According to the invention such a device is made in a way that a hood is positioned between the vehicle and the surface. The hood can be tightly connected to the vehicle or connected to the vehicle by at least one spring. The hood, which is open towards the surface, serves to accommodate a bladed wheel therein. Means are provided for driving the bladed wheel.

Rotation of the bladed wheel creates a vacuum underneath the hood and thus the before mentioned suction force is generated.

In this way the adhesion of the vehicle on the driveway at standstill as well as at any speed can be increased. This factual situation can be used favourably, for example, when driving fast on curves, when driving on slippery roads, when applying the brakes and when accelerating. The device is especially useful for light cars and such vehicles that are susceptible to wind, for tractors that have to haul heavy loads, and for cranes.

The normal atmospheric pressure can be decreased by approximately one-half by means of the device according to the invention, so that forces of 5 tons per 1 $m^2$ can result. With 1 Kilowatt, a force of 200 kp can be reached.

An embodiment of the invention is shown in the drawing wherein

Figure 2:
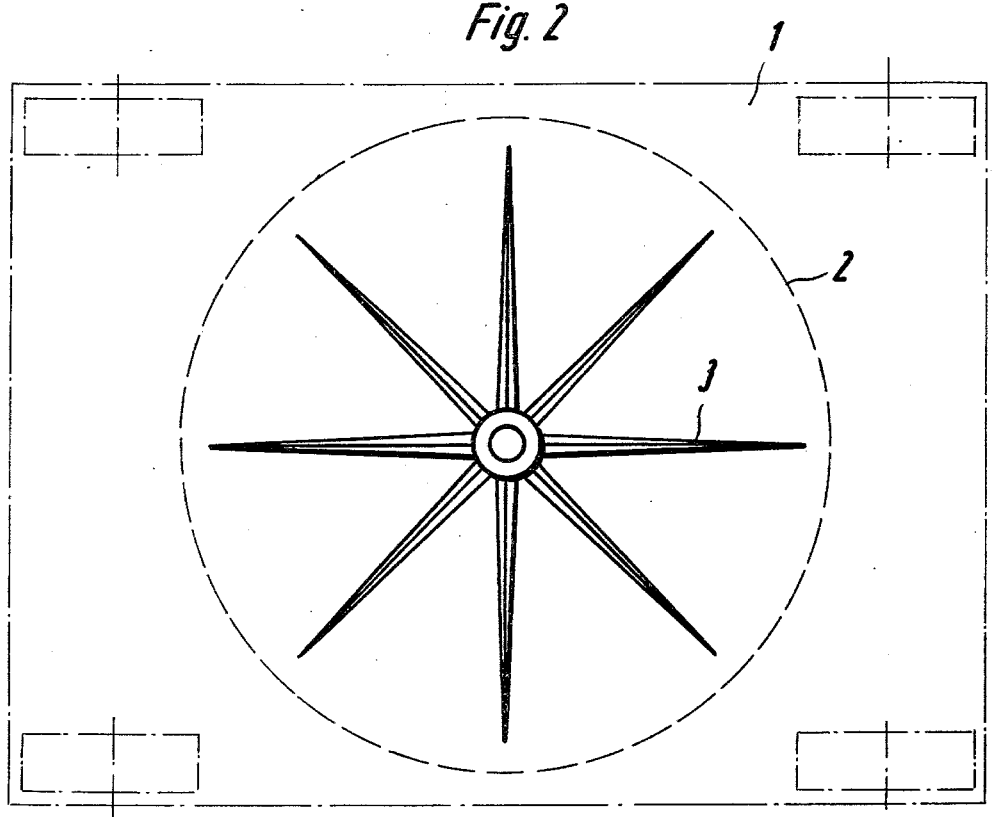

FIG. 1 is a vehicle with the device according to the invention in a schematic side view and FIG. 2 shows a bottom plan view of the embodiment of FIG. 1.

In the Figures, 1 is a vehicle, 2 a hood, 3 a bladed wheel, 4 a motor driving the bladed wheel 3, 5 a rubber lip at the rim of the hood 2 and 6 the driveway. If the bladed wheel 3 is turned, a vacuum is produced under the hood 2, forcing the vehicle 1 towards the driveway 6.

The distance between the hood 2 and the driveway 6 should be no greater than 1/10 of the diameter of the hood.

Instead of one lip 5, several concentric lips can be provided for. In this case, the distance between the vehicle and the driveway can be greater than the distance indicated above when one lip is used.

What is claimed is:

1. An apparatus for generating traction of a vehicle to a driveway surface by generating a suction force between said vehicle and said driveway surface, said apparatus including:
   a hood having an opened bottom and means for firmly mounting said hood to said vehicle to define a gap between the rim of said hood and said driveway surface;
   a wheel having radially extending blades rotatably mounted within said hood such that the axis of rotation of said bladed wheel is perpendicular to said driveway surface, and
   means for driving said bladed wheel,
   wherein at least a partial vacuum is created only under the entire hood through centrifugal force generated by the rotating wheel, said centrifugal force initially acting upon said air under said hood and expelling it radially therefrom, said centrifugal force further acting upon air entering said gap and expelling it radially therefrom.

2. An apparatus as claimed in claim 1 wherein said means for mounting said hood to said vehicle includes at least one spring.

3. An apparatus as claimed in claim 1 wherein said gap defined between the rim of said hood and said driveway surface is not greater than 1/10 of the diameter of said hood.

4. An apparatus for generating traction of a vehicle to a driveway surface by generating a suction force between said vehicle and said driveway surface, said apparatus including:
   a hood having an opened bottom and means for firmly mounting said hood to said vehicle to define a gap between the rim of said hood and said driveway surface,
   said hood having at least one elastic lip forming the rim of said hood,
   a wheel having radially extending blades rotatably mounted within said hood such that the axis of rotation of said bladed wheel is perpendicular to said driveway surface, and
   means for driving said bladed wheel,
   wherein at least a partial vacuum is created only under the entire hood through centrifugal force generated by the rotating wheel, said centrifugal force initially acting upon said air under said hood and expelling it radially therefrom, said centrifugal force further acting upon air entering said gap and expelling it radially therefrom.

5. An apparatus as claimed in claim 4 wherein said means for mounting said hood to said vehicle includes at least one spring.

6. An apparatus as claimed in claim 4 wherein said gap defined between the rim of said hood and said driveway surface is not greater than 1/10 of the diameter of said hood.

7. An apparatus as claimed in claim 4 wherein said hood has a plurality of concentric elastic lips forming the rim of said hood.

* * * * *